(12) United States Patent
Yoshida et al.

(10) Patent No.: US 6,215,652 B1
(45) Date of Patent: Apr. 10, 2001

(54) SOLID ELECTROLYTIC CAPACITOR AND MANUFACTURING METHOD THEREOF

(75) Inventors: Katsuhiro Yoshida; Noriko Kuge, both of Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/310,863

(22) Filed: May 13, 1999

(30) Foreign Application Priority Data

May 15, 1998 (JP) .................................................. 10-133791

(51) Int. Cl.⁷ .................................. H01G 4/06; H01G 9/04
(52) U.S. Cl. ......................... 361/524; 361/528; 29/25.03
(58) Field of Search ................................ 361/524, 528, 361/529, 508; 29/25.03

(56) References Cited

FOREIGN PATENT DOCUMENTS

| | | |
|---|---|---|
| S52-039164 | 3/1977 | (JP) . |
| H03-069108 | 3/1991 | (JP) . |
| 4-69914 | 3/1992 | (JP) . |
| H07-508618 | 9/1995 | (JP) . |
| WO98/38660 * | 9/1998 | (JP) . |

OTHER PUBLICATIONS

WO94/25971, published Nov. 10, 1994.

* cited by examiner

*Primary Examiner*—Anthony Dinkins
(74) *Attorney, Agent, or Firm*—Sughrue, Mion, Zinn, Macpeak & Seas, PLLC

(57) ABSTRACT

A solid electrolytic capacitor is here disclosed in which a dielectric layer formed on the surface of an anode obtained by molding and then sintering a niobium metal powder which includes a niobium oxide layer and a niobium nitride region, and a method for manufacturing the solid electrolytic capacitor is also disclosed.

9 Claims, 4 Drawing Sheets

SOLID ELECTROLYTIC CAPACITOR AND MANUFACTURING METHOD THEREOF

BACKGROUND OF THE INVENTION (i) Field of the Invention

The present invention relates to a solid electrolytic capacitor in which niobium is used as an anode (hereinafter referred to as "the niobium solid electrolytic capacitor"), and more specifically, it relates to a solid electrolytic capacitor in which the change of a capacitance before and after a reflow step can be restrained, and a manufacturing method of the solid electrolytic capacitor.

(ii) Description of the Prior Art

A solid electrolytic capacitor generally comprises an oxide layer as a dielectric layer on the surface of a valve action metal sinter, a cathode layer formed thereon, and a cathode outgoing lead extending from the cathode layer.

Here, the above valve action metal sinter can be obtained by compressing/molding a valve action metal powder, and then heating the thus molded article at a high temperature in vacuum. On the other hand, the oxide layer can be formed by anodization.

The valve action metal means a metal having a valve action, and examples of such a valve action metal include aluminum, titanium, zirconium, niobium, hafnium and tantalum. Among them, the practical metals are limited to aluminum and tantalum at present. Aluminum is usually used in the form of an etched aluminum foil as an anode. Therefore, it is no exaggeration that the solid electrolytic capacitor using the valve action metal sinter is limited to a solid electrolytic capacitor alone in which tantalum is used as the anode (hereinafter referred to as "the tantalum solid electrolytic capacitor").

The reason why the valve action metal is limited to tantalum alone is that its capacitance is stable. For example, in the case of the niobium solid electrolytic capacitor, the oxide layer of the dielectric layer is much more easily affected by heat as compared with the case of the above tantalum solid electrolytic capacitor, so that the capacitance easily changes. Particularly in a reflow step of parts, heating is given at a temperature of 200 to 260° C. for a period of several seconds to about 10 seconds, but this heating causes the capacitance of the niobium solid electrolytic capacitor to change. For this reason, the niobium solid electrolytic capacitor cannot attain a practical level.

SUMMARY OF THE INVENTION

An object of the present invention is to provide a niobium solid electrolytic capacitor in which the change of a capacitance before and after a reflow step during the mounting of parts can be restrained.

Another object of the present invention is to provide a method for manufacturing this niobium solid electrolytic capacitor.

The first aspect of the present invention is directed to a solid electrolytic capacitor in which a dielectric layer formed on the surface of an anode obtained by molding and then sintering a niobium metal powder comprises a niobium oxide layer and a niobium nitride region.

The second aspect of the present invention is directed to a method for manufacturing a solid electrolytic capacitor which comprises a step of molding and sintering a niobium metal powder to form an anode, and then subjecting the surface of this anode to a nitriding treatment, and a step of anodizing the thus nitrided anode to form a dielectric layer comprising a niobium oxide layer and a niobium nitride region.

According to the present invention, it is possible to remarkably restrain the fluctuation of a capacitance in a reflow step during the mounting of parts.

The present inventors can presume this reason as follows. That is to say, in a heating step such as the reflow step, oxygen diffusion occurs from the niobium oxide layer to the base side of the niobium anode, so that the capacitance increases. In this heating step, however, nitrogen contained in the dielectric layer does not diffuse so much as oxygen. In consequence, a relative ratio of the nitride in the dielectric layer increases. Here, a dielectric constant of niobium nitride is lower as compared with that of niobium oxide, and therefore, the increase of the relative ratio of the nitride leads to the effect of lowering the capacitance. As described above, the present inventors can suppose that the increase of the capacitance by the diffusion of oxygen is offset by the increase of the relative ratio of the nitride having a low dielectric constant.

DETAILED DESCRIPTION OF THE PREFERRED EMBODIMENTS

Figure 1:
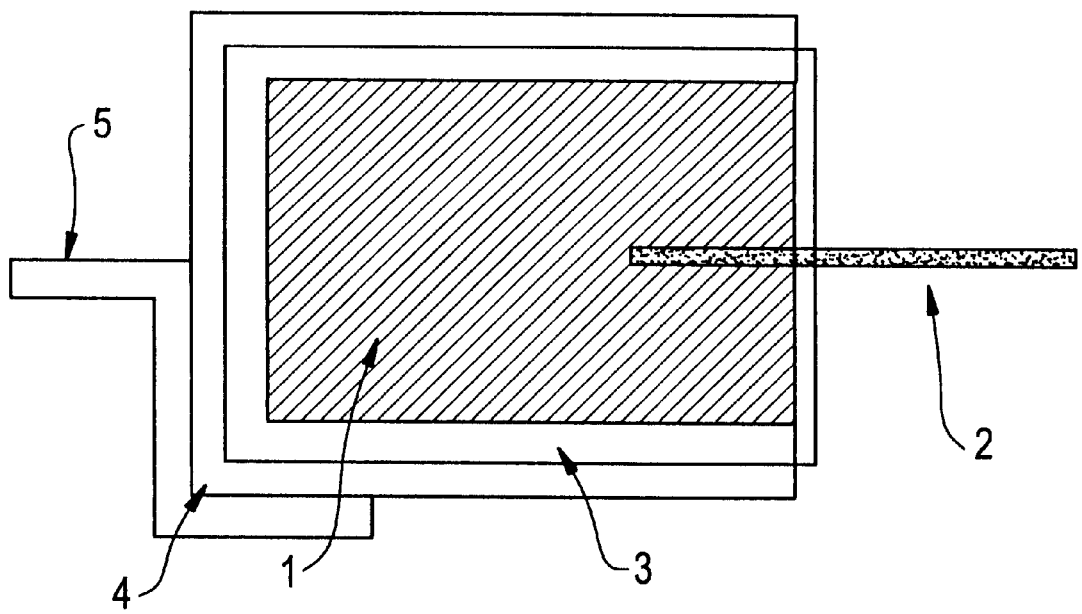
FIG. 1 is a sectional view of a solid electrolytic capacitor according to the present invention before it is encapsulated.

One embodiment of the present invention will be described with reference to drawings. FIG. 1 is a view showing one embodiment of a niobium solid electrolytic capacitor. In this drawing, a niobium metal lead wire 2 is buried in a base 1 of an anode obtained by molding and then sintering a niobium powder. A dielectric layer 3 is formed so as to cover the surface of this anode base 1. The thickness of the dielectric layer 3 depends on a designed capacitance of the capacitor, but for example, it is in the range of about 50 to 3000 nm.

The dielectric layer 3 comprises a niobium oxide layer and a niobium nitride region, and with regard to the structure of this dielectric layer, the following five modifications can be contrived.

Figure 2:
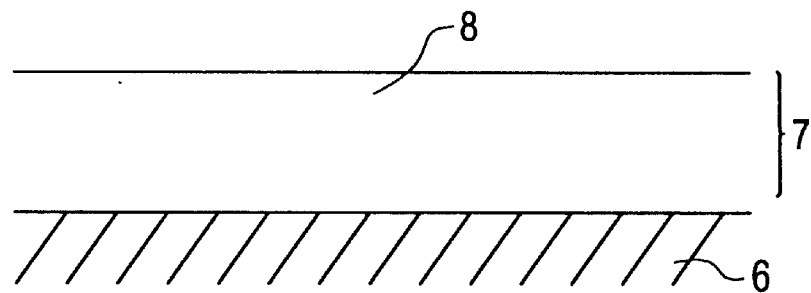
FIG. 2 is an enlarged schematic view of a dielectric layer in the solid electrolytic capacitor according to the present invention.

(1) A case where niobium nitride is uniformly dispersed in the niobium oxide layer (FIG. 2).

In FIG. 2, a dielectric layer 7 is formed on a base 6 of the niobium metal anode, and this dielectric layer 7 comprises a niobium oxide layer 8 and niobium nitride uniformly dispersed in this niobium oxide layer 8. Also in this case where niobium nitride is uniformly dispersed in the dielectric layer, it is considered that the nitride region is present.

Figure 3:
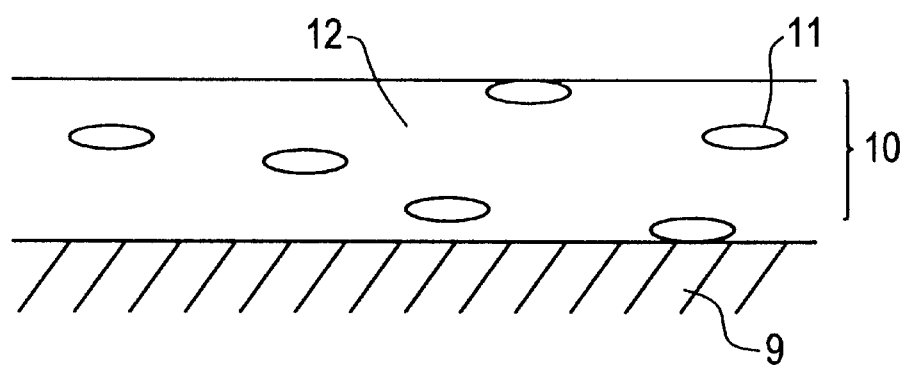
FIG. 3 is an enlarged schematic view of another dielectric layer in the solid electrolytic capacitor according to the present invention.

(2) A case where masses of niobium nitride are dispersed in the niobium oxide layer (FIG. 3).

In FIG. 3, a dielectric layer 10 is formed on a base 9 of the niobium metal anode, and this dielectric layer 10 comprises a niobium oxide layer 12 and masses 11 of niobium nitride dispersed in this niobium oxide layer 12. Also in this case where the masses of niobium nitride are dispersed in the niobium oxide layer, it is considered that the niobium nitride region is present. Moreover, the niobium nitride region does not have to possess a definite boundary between itself and the oxide layer.

Figure 4:
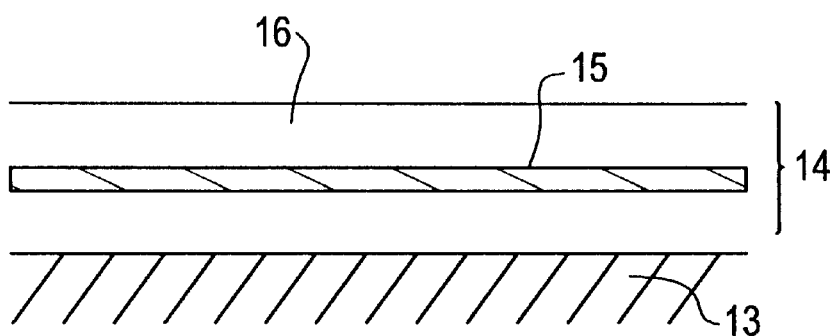
FIG. 4 is an enlarged schematic view of still another dielectric layer in the solid electrolytic capacitor according to the present invention.

(3) A case where a niobium nitride layer is present in the form of a layer in the niobium oxide layer (FIG. 4).

In FIG. 4, a dielectric layer 14 is formed on a base 13 of the niobium metal anode, and this dielectric layer 14 comprises a niobium oxide layer 16 and a niobium nitride layer 15 present in the niobium oxide layer 16. This niobium nitride layer 15 may exist at an optional position of the dielectric layer. Furthermore, the niobium nitride region does not have to possess a definite boundary between itself and the oxide layer. Also in this case that the niobium nitride layer is present in the niobium oxide layer as described above, it is considered that the niobium nitride region is present.

(4) A case where the dielectric layer 3 in FIG. 1 is a dielectric layer which partially has two optional structures of the above paragraphs (1), (2) and (3).

(5) A case where the dielectric layer 3 in FIG. 1 is a dielectric layer which partially has three optional structures of the above paragraphs (1), (2) and (3).

The present invention covers all the cases of the above paragraphs (1) to (5).

The content of niobium nitride can be determined as a nitrogen content with respect to the total of the anode which is obtained by molding and then sintering a niobium metal powder and which is further subjected to a nitriding treatment.

This nitrogen content is preferably in the range of 900 to 2300 ppm. If the nitrogen content is high, a change rate of a capacitance before and after a reflow step decreases, but a leakage current value of the capacitor also increases. In view of the balance of both, a content of 900 to 2300 ppm is optimum.

Next, as shown in FIG. 1, a cathode layer 4 is formed outside the dielectric layer 3. In the present invention, the usual cathode layer can be used. Its example is the cathode layer in which a manganese dioxide layer, a graphite layer, a silver paste layer are formed in turn.

Furthermore, in place of the manganese dioxide layer, a conductive polymer material layer can be formed. For the formation of the manganese dioxide layer, a heating step at 200° C. or more is required, but the formation of the conductive polymer material layer can be accomplished at ordinary temperature. For the purpose of stabilizing the capacitance, the formation of the conductive polymer material layer is advantageous from the viewpoint of a process.

This conductive polymer material is a polymer material showing a conductivity of a semiconductor range or more, and examples of the conductive polymer material include polyacetylenes, polyanilines, polyparaphenylenes, polypyrroles and polythiophenes. Above all, the polypyrroles are optimum, because they are excellent in frequency properties and film formability in electrolytic oxidation polymerization.

As shown in FIG. 1, a lead 5 for leading the anode is attached to the outside of the cathode layer 4 in such a manner as to contact the cathode layer 4.

Furthermore, the niobium solid electrolytic capacitor is encapsulated by an epoxy resin (not shown).

Figure 5:
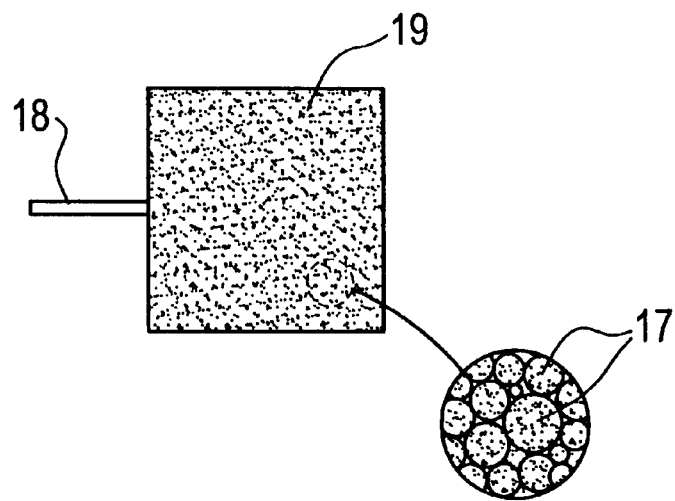
FIG. 5 is a schematic view showing a compressed article of a niobium metal powder before sintering.

In succession, an embodiment of a manufacturing method of this solid electrolytic capacitor will be described. A niobium metal powder having an average particle diameter of about 1 to 100 $\mu$m is mixed with a binder to prepare secondarily cohered grains. The preparation of the grains is for the sake of enhancing a moldability to some extent. Next, as shown in FIG. 5, a niobium metal lead wire 18 is buried in the grains 17, and they are then compression-molded by a pressing method. Afterward, the thus compression-molded article 19 is sintered at a temperature of 1200° C. to 1700° C. under a high vacuum of $10^{-5}$ Torr or less, preferably $10^{-6}$ Torr or less.

Figure 6:
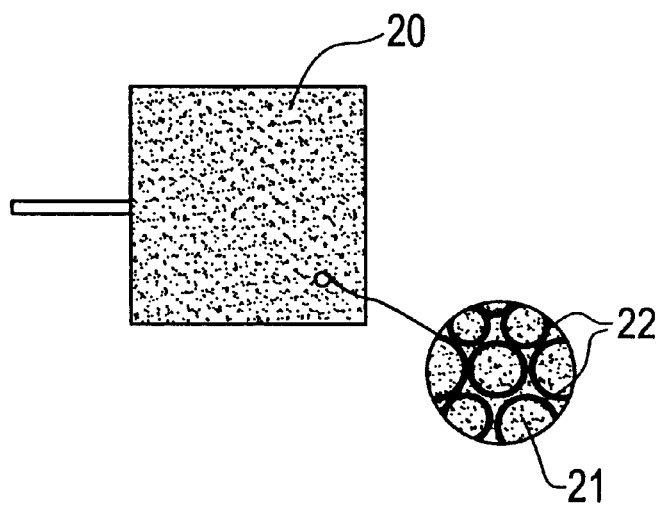
FIG. 6 is a schematic view showing an anode after its surface has been subjected to a nitriding treatment.

Next, in a cooling step after the sintering, a nitrogen gas is introduced into a sintering furnace, thereby forming a nitride 22 on the surface of a niobium metal 21 of a sintered anode 20, as shown in FIG. 6. It is known that when niobium is allowed to stand at a certain temperature under a nitrogen atmosphere, the nitride is formed, but according to the method of the present invention, there are advantages that the extreme surface of the anode can easily be subjected to a nitriding treatment and the amount of the nitride can easily be controlled. The the nitriding treatment step does not have to be carried out under the cooling conditions. For example, the sinter can be cooled at ordinary temperature, and then heated under the nitrogen atmosphere again to form the nitride.

Next, on the anode surface on which the nitride is formed, an oxide layer is then formed by anodization. The anodization means a step which comprises immersing the anode and a reference electrode in an electrolyte, connecting the anode to a high potential side and the reference electrode to a low potential side of DC, respectively, and then applying a voltage (hereinafter referred to as "the anodization voltage") across the electrodes to form the oxide layer. In the manufacturing method of the present invention, the oxide layer is formed in such a manner as to penetrate into the surface of the anode on which the nitride is formed, and simultaneously the nitride also moves by diffusion. As a result, the dielectric layer tends to take a combination of structures shown in FIGS. 3 and 4 (the masses of niobium nitride are partially dispersed, and niobium nitride is partially present in the form of a layer in the niobium oxide layer), or a combination of structures shown in FIGS. 2, 3 and 4 (niobium nitride is partially uniformly dispersed, the masses of niobium nitride are partially dispersed, and niobium nitride is partially present in the form of a layer in the niobium oxide layer). Next, on this dielectric layer, a cathode layer is formed. In the present invention, the usual cathode layer can be used. For example, a manganese dioxide layer is formed on the dielectric layer, and a graphite layer is formed outside the manganese dioxide layer and a silver paste layer is further formed outside the graphite layer. Alternatively, in place of the manganese dioxide layer, a conductive polymer material layer may be formed, and the graphite layer may be formed outside the conductive polymer material layer and the silver paste layer may be further formed outside the graphite layer. As described above, the manganese dioxide layer is industrially formed by the thermal decomposition of manganese nitrate, and so a heating step at 200° C. or more is involved. On the contrary, the conductive polymer material can be formed by the electrolytic oxidation polymerization at ordinary temperature, and so, from the viewpoint of the stabilization of the capacitance, the manufacturing method in which the conductive polymer material is used is considered to be advantageous.

Among the conductive polymer materials, the polypyrroles which are excellent in frequency properties and film formability in the electrolytic oxidation polymerization are most preferable, as described above.

Onto this cathode layer, an outgoing lead for the anode is attached, and afterward, it is then encapsulated by an epoxy resin to obtain the solid electrolytic capacitor.

Example 1

A niobium metal powder having an average particle diameter of 10 μm was mixed with 3% by weight of a binder to prepare secondarily cohered grains. Next, as shown in FIG. 5, a niobium metal lead wire 2 was buried in 0.15 g of the grains 17, and the grains were then compression-molded by a pressing method. The thus compression-molded article 3 was sintered at a temperature of 1600° C. under a high vacuum of $10^{-6}$ Torr or less for 30 minutes.

Next, in a cooling step after the sintering, a nitrogen gas was introduced into a sintering furnace, and the sintered article was then maintained at a nitriding treatment temperature of 300° C. under a nitrogen atmosphere of 300 Torr for 5 minutes to form a nitride 22 on the surface of the anode, as shown in FIG. 6. A nitrogen content to this anode was 850 ppm.

Next, on the surface of the anode on which the nitride was formed, an oxide layer was formed by anodization. In this case, an anodization voltage of 30 V was applied to the anode through a reference electrode so that a final capacitance might be 2 μF, thereby forming the oxide layer.

On this oxide layer, a polypyrrole layer was formed by electrolytic oxidation polymerization, and a graphite layer and a silver paste layer were formed in turn. In this case, the thickness of the polypyrrole layer was in the range of 10 to 20 μm, and the thicknesses of the graphite layer and the silver paste layer were 20 to 50 μm, respectively.

Furthermore, an outgoing lead wire for the anode was disposed on the cathode layer, and then encapsulated by an epoxy resin to obtain a desired solid electrolytic capacitor thereby.

For this solid electrolytic capacitor, a change of a capacitance before and after reflow as well as a value of a leakage current were measured.

As reflow conditions which were applied to the solid electrolytic capacitor of this example, an air reflow system, a peak temperature of 240° C. and a peak temperature holding time of 10 seconds were employed.

Figure 7:
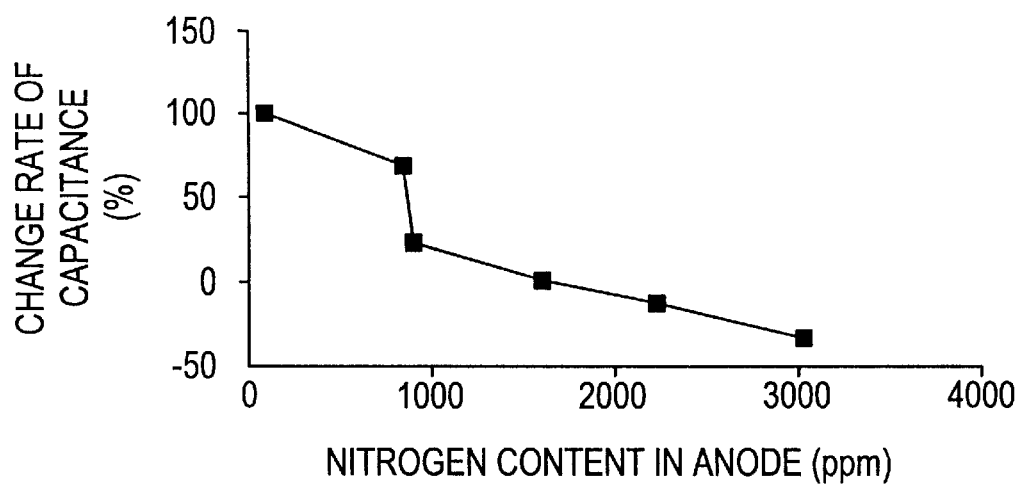
FIG. 7 is a diagram showing a relation between a nitrogen content in the anode and a change rate of a capacitance before and after a reflow step.

The measurement of the capacitance was carried out at a frequency of 120 Hz under an effective voltage of 1.0 V and a bias voltage of 1.5 V, and evaluation was made in accordance with a change rate of the capacitance before and after the reflow represented by the formula 1. The results are shown in FIG. 7.

*Change rate (%) of capacitance=(capacitance after reflow)/(capacitance before reflow)×100*    Formula 1

Figure 8:
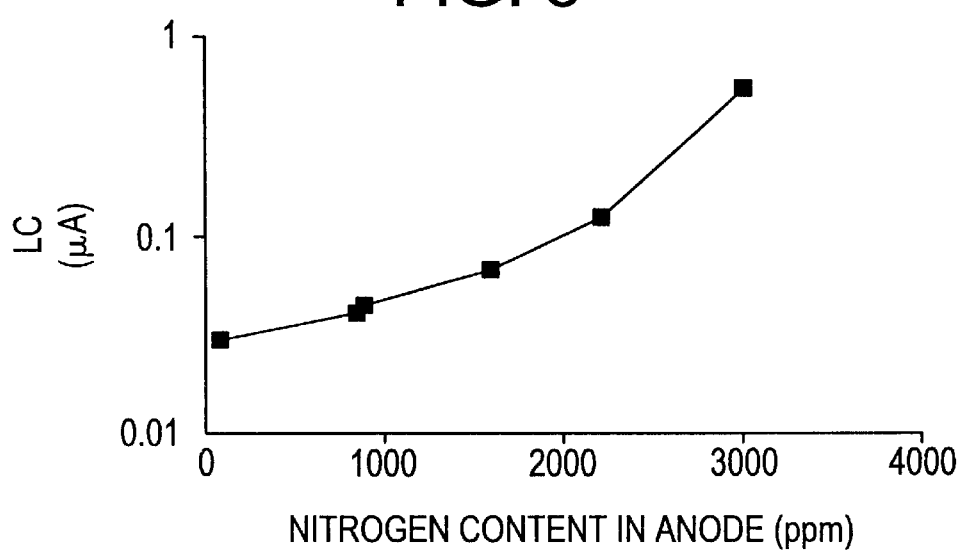
FIG. 8 is a diagram showing a relation between the nitrogen content in the anode and a leakage current.

The leakage current was measured under conditions that an application voltage was a voltage of 70% of the anodization voltage and an application time was 1 minute. Since the anodization voltage in this example was 30 V, a voltage of 21 V was applied. The results are shown in FIG. 8.

The change rate of the capacitance was about 68%, which meant that the effect of the nitriding treatment was observed. Furthermore, the value of the leakage current was about 0.03 μF, which was a good value.

Examples 2 to 5

The same procedure as in Example 1 was conducted except that a nitriding treatment was carried out at each temperature shown in Table 1 and a nitrogen content to an anode obtained by sintering was altered as shown in Table 1, thereby manufacturing solid electrolytic capacitors. The results of the change rate of a capacitance are shown in FIG. 7, and the results of evaluation of a leakage current are shown in FIG. 8.

TABLE 1

|  | Treatment Temp. (° C.) | Nitrogen Content (ppm) |
| --- | --- | --- |
| Example 1 | 300 | 850 |
| Example 2 | 450 | 900 |
| Example 3 | 570 | 1600 |
| Example 4 | 600 | 2200 |
| Example 5 | 700 | 3000 |
| Comp. Ex. 1 | Untreated | 80 |

Notes:
Partial pressure of nitrogen during the treatment = 300 Torr
Treatment time = 5 minutes It is apparent from the results of Examples 1 to 5 that the change rate of the capacitance is reduced by the nitriding treatment and so an effect is observed. In this case, however, the value of the leakage current of the capacitor also increases. Therefore, in view of the valance of both the factors, the nitrogen content is preferably in the range of 900 to 3000 ppm, and it is most preferably in the range of 900 to 2300 ppm in which the change rate of capacitance is in the range of ±20%.

Comparative Example 1

The same procedure as in Example 1 was conducted except that the nitriding treatment of Example 1 was not carried out, thereby manufacturing a solid electrolytic capacitor. The results of the change rate of a capacitance are shown in FIG. 7, and the evaluation results of a leakage current are shown in FIG. 8. The change rate of the capacitance was about 100%, and it is apparent that this change rate was higher as compared with the case where the nitriding treatment was carried out.

According to the present invention described above, there can be provided a solid electrolytic capacitor in which niobium is used as an anode and the change of a capacitance before and after a subsequent reflow step of parts can be restrained, and a manufacturing method of the solid electrolytic capacitor.

What is claimed is:

1. A solid electrolytic capacitor in which a dielectric layer formed on the surface of an anode obtained by molding and then sintering a niobium metal powder comprises a niobium oxide layer and a niobium nitride region.

2. The solid electrolytic capacitor according to claim 1 wherein a nitrogen concentration in the anode is in the range of 900 to 2300 ppm.

3. The solid electrolytic capacitor according to claim 1 wherein a conductive polymer material layer, a graphite layer and a silver paste layer are formed in this order as cathode layers on the surface of the dielectric layer.

4. The solid electrolytic capacitor according to claim 3 wherein the conductive polymer material layer is a conductive polymer material layer comprising a polypyrrole.

5. A method for manufacturing a solid electrolytic capacitor which comprises a step of molding and sintering a niobium metal powder to form an anode, and then subjecting a surface of this anode to a nitriding treatment, and a step of anodizing the nitrided anode to form a dielectric layer comprising a niobium oxide layer and a niobium nitride region.

6. The method for manufacturing the solid electrolytic capacitor according to claim 5 wherein the niobium metal powder is heated under a nitrogen atmosphere.

7. The method for manufacturing the solid electrolytic capacitor according to claim 5 wherein a nitrogen concentration in the anode obtained by the nitriding treatment is in the range of 900 to 2300 ppm.

8. The method for manufacturing the solid electrolytic capacitor according to claim 7 wherein after the anodization, a conductive polymer material layer, a graphite layer and a silver paste layer are formed in this order as cathode layers.

9. The method for manufacturing the solid electrolytic capacitor according to claim 8 wherein the conductive polymer material layer is a conductive polymer material layer comprising a polypyrrole.

* * * * *